US008200485B1

(12) United States Patent  (10) Patent No.: US 8,200,485 B1
Lee  (45) Date of Patent: Jun. 12, 2012

(54) VOICE INTERFACE AND METHODS FOR IMPROVING RECOGNITION ACCURACY OF VOICE SEARCH QUERIES

(75) Inventor: Nicholas J. Lee, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 3166 days.

(21) Appl. No.: 09/650,173

(22) Filed: Aug. 29, 2000

(51) Int. Cl.
 *G10L 15/00* (2006.01)
(52) U.S. Cl. ........................................ 704/231; 704/251
(58) Field of Classification Search .................. 704/231, 704/251, 277, 1–9
 See application file for complete search history.

(56) References Cited

U.S. PATENT DOCUMENTS

| | | | |
|---|---|---|---|
| 5,337,347 A | 8/1994 | Halstead-Nussloch et al. | |
| 5,452,397 A | 9/1995 | Ittycheriah et al. | |
| 5,758,322 A * | 5/1998 | Rongley | 704/275 |
| 5,774,628 A | 6/1998 | Hemphill | |
| 5,774,859 A * | 6/1998 | Houser et al. | 704/275 |
| 5,832,428 A | 11/1998 | Chow et al. | |
| 5,917,889 A * | 6/1999 | Brotman et al. | 379/88.01 |
| 5,917,944 A * | 6/1999 | Wakisaka et al. | 382/190 |
| 5,995,928 A * | 11/1999 | Nguyen et al. | 704/251 |
| 6,014,624 A * | 1/2000 | Raman | 704/243 |
| 6,061,654 A * | 5/2000 | Brown et al. | 704/275 |
| 6,073,100 A * | 6/2000 | Goodridge, Jr. | 704/258 |
| 6,137,863 A * | 10/2000 | Brown et al. | 379/88.01 |
| 6,144,938 A * | 11/2000 | Surace et al. | 704/257 |
| 6,148,105 A * | 11/2000 | Wakisaka et al. | 382/190 |
| 6,161,090 A * | 12/2000 | Kanevsky et al. | 704/246 |
| 6,163,768 A * | 12/2000 | Sherwood et al. | 704/251 |
| 6,178,404 B1 * | 1/2001 | Hambleton et al. | 704/275 |
| 6,188,985 B1 | 2/2001 | Thrift et al. | |

(Continued)

FOREIGN PATENT DOCUMENTS

WO   WO 00/14729   3/2000

OTHER PUBLICATIONS

Davis, J., "Let Your Fingers Do the Spelling: Disambiguating Words Spelled with the Telephone Keypad," Journal of the American Voice I/O Society 9 (AVIOSJ), Mar. 1991, pp. 57-66.

(Continued)

*Primary Examiner* — Michael N Opsasnick
(74) *Attorney, Agent, or Firm* — Knobbe, Martens, Olson & Bear LLP

(57) ABSTRACT

A system and associated methods are disclosed for improving voice recognition accuracy when a user conducts a search by voice. One method involves prompting the user to enter a set of characters of the query (e.g., the first N letters of a query term), and then using these letters to execute a preliminary search. The results of the preliminary search are then used to generate a dynamic grammar for interpreting the full voice query. The grammar may alternatively be retrieved from a cache or other memory that stores the grammars for various combinations of letters. In one embodiment, the user enters the characters by selecting the corresponding keys on a standard telephone keypad (one depression per letter) and then saying the letters, and the keypad entries are used to reduce the number of possible interpretations of each character utterance. Another method, which is useful for search refinement, involves generating a dynamic grammar from a set of search results (e.g., when the number of hits is large), and then using this grammar to interpret utterances of additional query terms to be added to the query.

48 Claims, 4 Drawing Sheets

U.S. PATENT DOCUMENTS

| | | |
|---|---|---|
| 6,223,059 B1 | 4/2001 | Haestrup |
| 6,282,512 B1 | 8/2001 | Hemphill |
| 6,307,549 B1 | 10/2001 | King et al. |
| 6,308,157 B1 * | 10/2001 | Vanbuskirk et al. .......... 704/275 |
| 6,311,182 B1 * | 10/2001 | Colbath et al. .................... 707/6 |
| 6,324,513 B1 * | 11/2001 | Nagai et al. .................. 704/275 |
| 6,334,103 B1 * | 12/2001 | Surace et al. ................. 704/257 |
| 6,377,927 B1 * | 4/2002 | Loghmani et al. ............ 704/275 |
| 6,392,640 B1 | 5/2002 | Will |
| 6,434,524 B1 * | 8/2002 | Weber ........................... 704/257 |
| 6,456,974 B1 | 9/2002 | Baker et al. |
| 6,694,295 B2 | 2/2004 | Lindholm et al. |
| 6,778,970 B2 * | 8/2004 | Au .................................. 706/55 |
| 6,839,669 B1 * | 1/2005 | Gould et al. .................. 704/246 |
| 6,850,252 B1 * | 2/2005 | Hoffberg ...................... 715/716 |
| 6,853,962 B2 * | 2/2005 | Appleby ........................... 703/2 |
| 6,856,986 B1 * | 2/2005 | Rossides .......................... 707/1 |
| 6,859,776 B1 * | 2/2005 | Cohen et al. ................. 704/270 |
| 6,865,528 B1 * | 3/2005 | Huang et al. ................. 704/275 |
| 6,871,174 B1 * | 3/2005 | Dolan et al. ....................... 704/9 |
| 6,941,273 B1 * | 9/2005 | Loghmani et al. ............... 705/26 |
| 6,952,666 B1 * | 10/2005 | Weise ................................ 704/9 |
| 6,957,184 B2 * | 10/2005 | Schmid et al. ................ 704/257 |
| 6,963,633 B1 * | 11/2005 | Diede et al. ................. 379/88.03 |
| 6,981,217 B1 * | 12/2005 | Knauft et al. ................. 715/531 |
| 6,999,563 B1 * | 2/2006 | Thorpe et al. ................ 379/67.1 |
| 7,027,987 B1 | 4/2006 | Franz et al. |
| 7,050,977 B1 * | 5/2006 | Bennett ...................... 704/270.1 |
| 7,110,948 B1 | 9/2006 | Mekuria |
| 7,136,854 B2 | 11/2006 | Smith et al. |
| 2001/0034603 A1 | 10/2001 | Thrift et al. |

OTHER PUBLICATIONS

Marx, M., et. at., "Reliable Spelling Despite Unreliable Letter Recognition," Proceedings of the 1994 Conference of the American Voice I/O Society (AVIOS), San Jose, California, Sep. 1994.

Marx, M., et. al., "Putting people first: specifying proper names in speech interfaces," Proceedings of the ACM symposium on User interface software and technology (UIST), 1994, pp. 29-37.

* cited by examiner

VOICE INTERFACE AND METHODS FOR IMPROVING RECOGNITION ACCURACY OF VOICE SEARCH QUERIES

FIELD OF THE INVENTION

The present invention relates to voice driven interfaces, and more particularly, relates to methods for improving speech recognition reliability when a user performs a voice-based search.

BACKGROUND OF THE INVENTION

With the increasing popularity of wireless devices, many web site operators and other content providers are deploying voice driven interfaces ("voice interfaces") for allowing users to browse their content. The voice interfaces commonly include "grammars" that define the valid utterances (words, phrases, etc.) that can occur at a given state within a browsing session. The grammars are fed to a voice recognition system and are used to interpret the user's voice entry. In web-based systems, the grammars are typically embedded as text files within voiceXML versions of web pages.

One problem with voice recognition systems is that the reliability of the recognition process tends to be inversely proportional to the size of the grammar. This poses a significant problem to content providers wishing to place large databases of products or other items online in a voice-searchable form. Specifically, if all or even a significant portion of the terms in the searchable domain are incorporated into the grammar, the grammar may become too large to provide reliable voice recognition. If, on the other hand, many terms are omitted from the grammar, the system will be incapable of recognizing many valid queries. The present invention seeks to address this problem.

SUMMARY OF THE INVENTION

The present invention provides a voice interface and methods for improving voice recognition reliability when a user searches a large database or domain of items. The items may, for example, be product descriptions within a merchant's catalog, web pages indexed by a web crawler, or any other type of database item commonly searched for by users. The invention is particularly well suited to conducting searches in which the search query contains the name of a person or other entity (e.g., the name of an author, artist, actor, director, company, lecturer or musical group associated with a particular item), but may also be used in a variety of other contexts.

In accordance with one aspect of the invention, the user is initially prompted to supply a set or string of characters from the query, such as one or more letters of a query term. The type of the query term may be dependent upon the context of the search. For example, if the user is conducting an author search for books, the user may be prompted to enter the first few letters of the author's first or last name. The characters may, for example, be entered by voice, a telephone keypad, a fully functional keyboard, or a combination thereof. The user is also prompted to supply the complete query by voice.

To process the voice query, a grammar is dynamically generated (or possibly read from memory) according to the set of characters supplied by the user. This grammar is preferably derived from the subset of database items corresponding to the entered characters. For example, if the user enters the first three letters of an author's name, the grammar may be derived from all items having authors whose names start with these characters. Because the grammar is derived from the matching items, as opposed to all items within the particular domain being searched, the grammar is smaller in size and produces a significantly more reliable voice recognition result. In one embodiment, a grammar is generated each time a user searches for an item. In another embodiment, once a grammar is generated, the grammar is saved in memory for some defined length of time for use with other search requests.

Another aspect of the invention involves a method that may be used to receive an alphabetic character input from a user of a device having a standard telephone keypad. To obtain the character input, the user is prompted to enter the letters on a telephone keypad with one key depression per letter. For example, to enter the character string "king," the user would select the telephone digits 5464. The user is also prompted to say the same letters, and these letter utterances are interpreted by the voice recognition system such that the only valid interpretations for a given utterance are the (three or four) letters associated with the corresponding key. For example, for the telephone digit "2," the voice recognition system would only recognize the letters A, B and C as valid utterances. This method of character entry significantly reduces misinterpretations by the voice recognition system of characters having similar sounds.

The present invention also provides a method for improving voice recognition accuracy when a user adds terms to a previously-submitted query to refine a search (e.g., when the search produces a large number of hits). The method involves generating the grammar using the items returned by the initial search (e.g., by extracting text from selected fields), and then using this grammar to interpret utterances as the user adds one or more query terms.

BRIEF DESCRIPTION OF THE DRAWINGS

These and other features will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

The present invention provides a system and associated methods for reducing the grammar space needed when searching a large database or domain using voice recognition processes. The invention may also be used to reduce the need for keyboard entry of queries.

For purposes of illustrating one particular application for the invention, the invention will be described primarily in the context of a system for allowing users to search a catalog of creative works represented within a database (e.g., book, music, and/or video titles). It will be recognized, however, that the invention may also be used for conducting searches for other types of items, such as web sites and pages indexed by a crawler, downloadable music files, companies, chat rooms, court opinions, telephone numbers, and other users.

It may be assumed throughout the description that each item (work) is represented in the database as a record containing multiple fields, each of which contains a particular type of data (e.g., author, title, subject, description, etc.). The term "item" will be used generally to refer both to the items themselves and to the database records for such items. The term "author" will be used to refer generally to a person or entity who contributed to a work, such as a writer of a book, an artist or group associated with a musical work, or an actor or producer of a movie.

Figure 1:
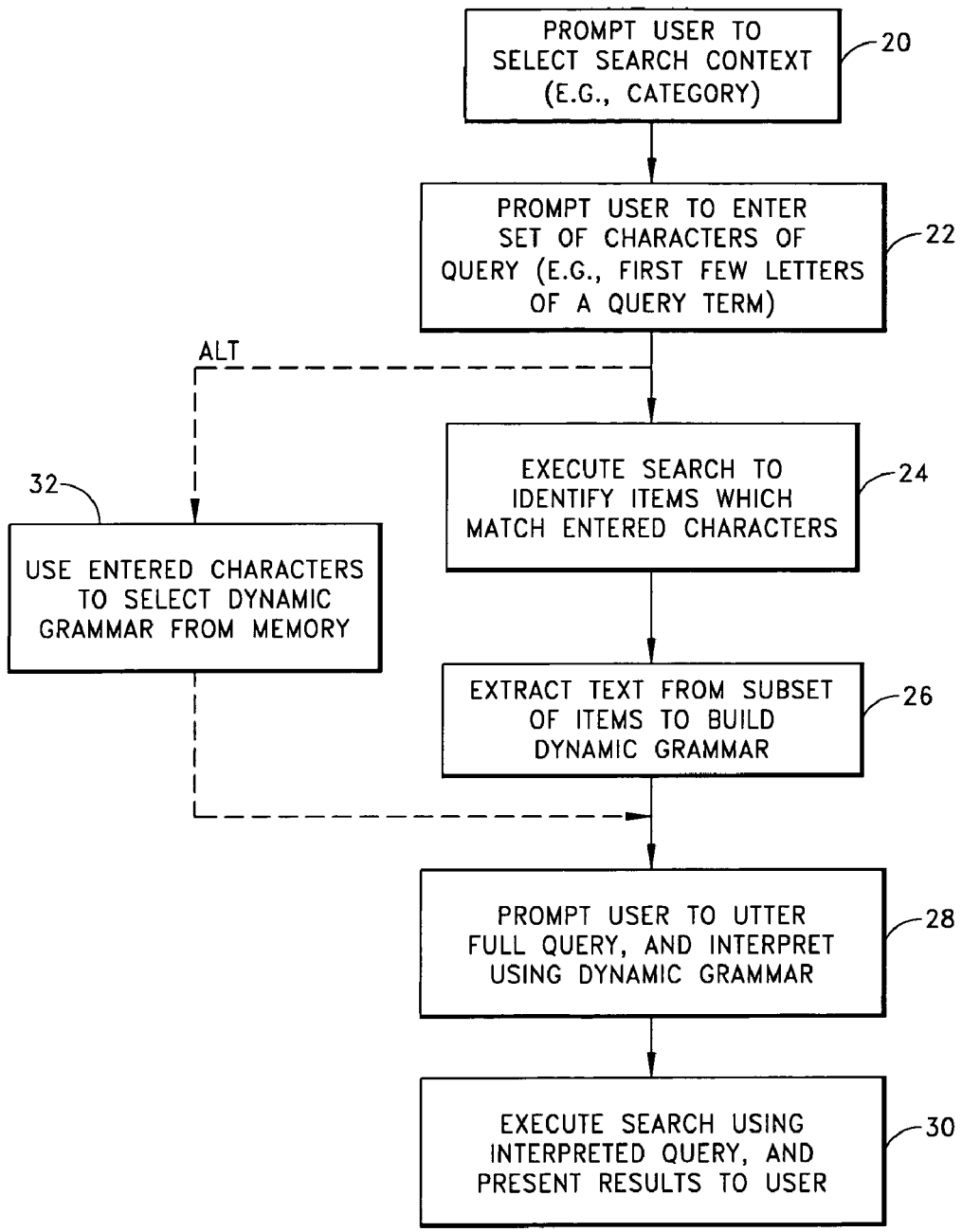
FIG. 1 illustrates a process for improving voice recognition accuracy of voice queries.

FIG. 1 illustrates a search process according to the invention. This process may be implemented through executable code and associated content of a web site or other system that provides voice searching capabilities. A conventional automated voice recognition (AVR) system that interprets voice according to externally supplied grammars may be used to implement the voice recognition tasks. Parenthetical reference numbers throughout the following description refer to process steps or tasks in the flow diagrams, while reference numbers without parenthesis refer to system components shown in FIG. 2.

As depicted by FIG. 1, the user may initially be prompted (by text or by voice) to select a search category or other context for performing the search (20). For example, the user may be prompted to select between books, music, videos, etc., and/or may be prompted to select between an "author search" (a field-restricted search in which the user specifies a name of an author) and a "title search" (a field-restricted search in which the user supplies one or more terms from the work's title). The selection may be made, for example, by clicking on a menu item or by providing a specified voice entry, depending upon the type of device and interface used. In another embodiment, only one search category may be made available so that the user need not select a category. In addition, the user may be permitted to submit queries that are not limited to a specific database field.

As further illustrated by FIG. 1, the system then prompts the user (by voice or by text) to enter a set or string of characters of the query—preferably the first one or more characters of a particular type of query term (22). The type of the query term may be dependent upon the context of the search. For example, if the user is conducting an author (artist) search for music titles, the user may be prompted to enter the initial letters of the name of an artist or musical group. The characters may be entered by the user by voice, a telephone keypad, a partial or full keyboard, or a combination of the foregoing. One particular method for entering characters using a combination of a telephone keypad and voice is disclosed in the description of FIG. 3.

The purpose of obtaining the set of characters is to narrow the scope of the search to a particular subset of items. This in turn allows a significantly smaller and more tailored grammar to be used to process the full voice query. As described below, the grammar is preferably generated from the query terms that may be used in the full query to describe the items falling within the subset. Although the user is preferably prompted to enter the first one or more characters of a query term, the user could alternatively be prompted, for example, to enter any consecutive string of characters of a query term, or to enter the first character of each term in the query (e.g., the first and last initials of an author).

As further illustrated in FIG. 1, the characters entered by the user are used to conduct an initial search for all matching items (works) within the database (24). For example, if the user is conducting an author search and has entered the first three letters of the author's name, a preliminary search would be conducted for all works having authors that start with these characters. This preliminary search is performed transparently to the user. The subset of items identified by this initial search is used to dynamically build a grammar for interpreting the full voice query (26). One method that may be used to generate the grammar is to simply build a list of all of the unique terms that appear in the relevant field or fields of the subset of items. For author searches, for example, this list would include all of the unique author names of the matching items; and for subject searches, the list would include all of the unique subject terms. To improve the reliability of the AVR process, the grammar may also define certain phrases as valid utterances. For example, for the author Stephen King, the grammar may define the following valid utterances: "Stephen," "King," and "Stephen King."

Although the grammar is preferably generated directly from the matching items, other types of criteria may optionally be incorporated into the grammar generation process. For example, if a set of preferences for the user indicates that he does not like a particular type of item (e.g., works from a particular author or works exceeding a particular price threshold), these items may be filtered from the subset before generating the grammar. Further, voice commands such as "new search" or "go back" may be added to the grammar.

Referring again to the character entry task (22) in FIG. 1, the number of characters entered by the user is ideally sufficiently large to produce a grammar that falls below a certain size threshold, such as 5000 valid utterances. The number of characters needed to provide the desired grammar size will typically depend largely on (1) the number of items in the domain being searched, (2) the database field or fields used to generate the grammar from the subset of items (e.g., author only, subject only, author plus title plus subject, etc.), and (3) the particular method used to select valid utterances from the relevant fields. In some embodiments, the user may be prompted to enter a fixed number of characters (e.g., 1, 2, 3, or 4), with this number being selected based on the context of the search (e.g., the category and type of the search). In other embodiments, the user may be permitted to enter any desired number of characters. In addition, the system could calculate the grammar size in real time as the user enters the characters, and notify the user once the number of entered characters is sufficient to produce the desired grammar size.

As further shown in FIG. 1, after the user has entered the first few letters of the query, the user is prompted, vocally or textually, to submit the full query by voice (28).

The AVR system interprets the voice query using the dynamically generated grammar. Typically, this task involves converting the utterances into corresponding character strings, and providing these strings to a conventional query server. Because the grammar is derived from a relatively small subset of items and is thus relatively small in size, the AVR process is significantly more accurate.

As depicted by the dashed line path in FIG. 1, rather than generating a grammar each time a search is performed, the appropriate grammar could alternatively be retrieved from memory in response to the character input (32). For example, once a grammar is generated, the grammar may cached in memory for a defined period of time (e.g., one day, or until the database is updated) so that it does not have to be regenerated each time the same character string is received. Alternatively, a hybrid approach may be used in which only the grammars for the most frequently used character strings are cached. Further, rather than using a caching scheme, the grammars for some or all of the possible character combinations could be generated periodically by an off-line process.

As depicted in FIG. 1, the text version of the query generated by the AVR system is used to conduct a search using conventional query processing methods (30). To reduce processing time and resources, the scope of this search may be limited to the subset of items identified during the preliminary search. The results of the search may be presented to the user by text or by voice using conventional methods.

Figure 2:
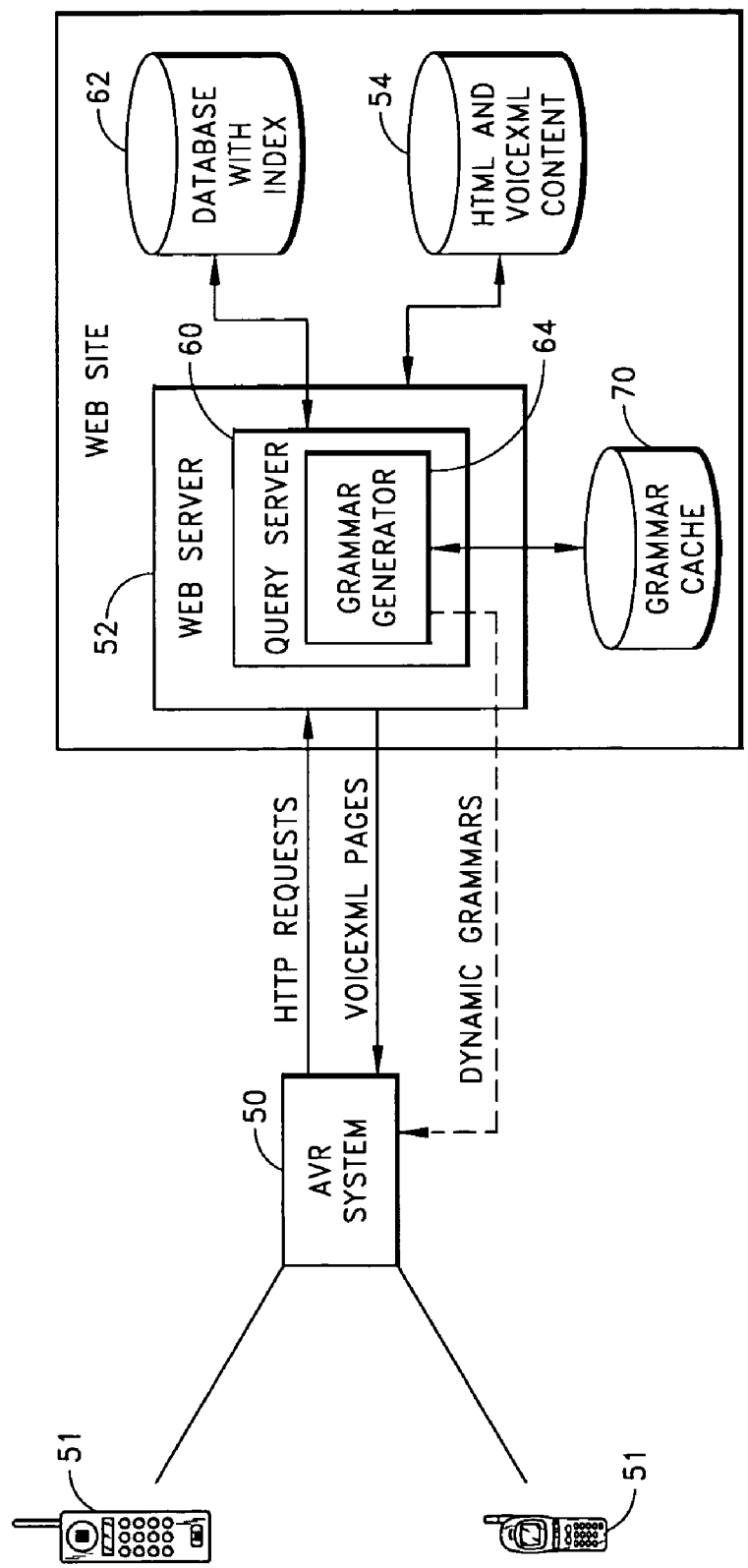
FIG. 2 illustrates a web-based system in which the invention may be embodied.

FIG. 2 illustrates a typical web site system in which the FIG. 1 process may be embodied, and shows some of the components that may be added to the system to implement the process. In this system, users can browse the web site using either a conventional web browser (not shown) or using the site's voice interface. Users of the voice interface connect to the site by establishing a telephone connection to a conventional AVR system 50 from a mobile or landline telephone 51. The AVR system may, but need not, be local to the web server. As illustrated, the AVR system sends HTTP requests to the web server, and receives voiceXML pages from the web server.

As shown in FIG. 2, the web server 52 accesses a repository of HTML and VoiceXML content 54 that is used to generate dynamic HTML and voiceXML pages.

Page requests generated by the AVR system 50 are normally only for voiceXML pages (i.e., correspond only to the URLs at which voiceXML pages are located). These voiceXML pages define the system's voice interface. As is conventional, the voiceXML pages specify speech or other audio to be played to the user by the AVR system during a browsing session. The voiceXML pages also contain grammars (in the form of text files) for specifying the valid utterances that can occur at a given state.

As further shown in FIG. 2, the web server 52 includes a query server 60 for allowing users to search an indexed database 62, such as a product database of an online merchant. The items represented within the database may include works such as book, music and video titles. The query server 60 includes or is linked to a dynamic grammar generator 64 that generates tailored, reduced-size grammars according to the process of FIG. 1. The query server 60 and dynamic grammar generator 64 are preferably implemented within software which runs on a general-purpose computer, but could alternatively be implemented in-whole or in-part within specialized hardware to provide a higher level of performance. The dynamic grammar generator 64 may access a cache 70 or other grammar storage system for permitting re-use of the dynamic grammars, as described above.

Figure 3:
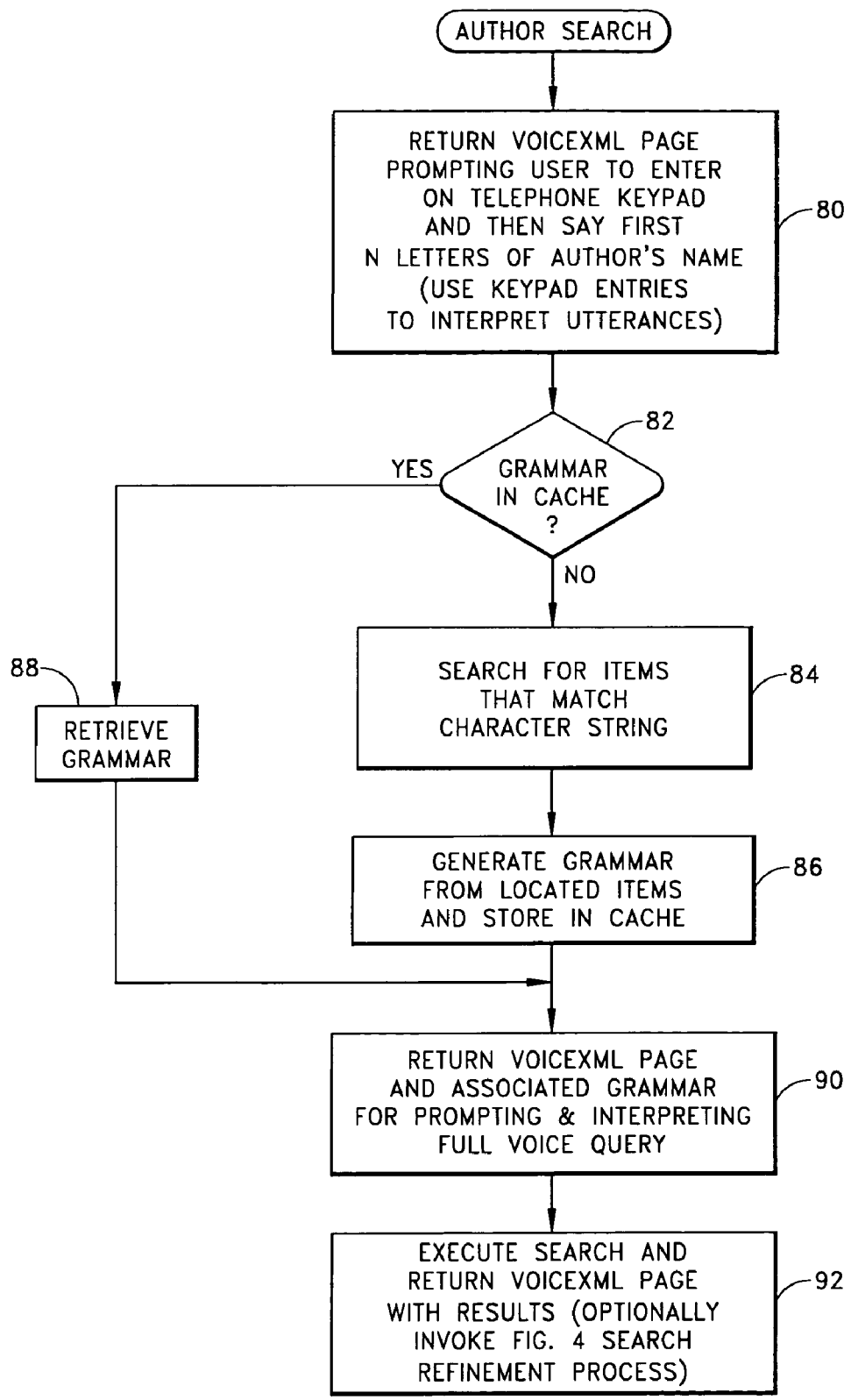
FIG. 3 illustrates a more detailed implementation of the process shown in FIG. 1, as applied to author searches in the context of the system of FIG. 2.

FIG. 3 illustrates a preferred process by which voice-based author searches are performed within the FIG. 2 system, according to the method of FIG. 1. The process is implemented within the executable code of the query server 60 together with associated voiceXML pages. The author search may, but need not, be limited to a particular category of items (books, music, videos, etc).

Initially, a voiceXML page is sent to the AVR system prompting the user (by voice) to type in, and then say, the first N letters of an author's name (80). For example, if the user is searching for music titles by the artist Sting, the user might initially type "784" on the telephone keypad and then say the letters "STI." The AVR system uses each keypad entry to narrow the set of valid utterances associated with each spoken letter. For example, for the telephone digit "2," the AVR system would only recognize the letters A, B and C as valid utterances, rather than all twenty six letters of the alphabet. This method of character entry significantly reduces misinterpretations by the AVR system of characters having similar sounds.

The character entry task can be varied, for example, by having the user utter each character immediately after the corresponding telephone key has been depressed, or by having the user utter all of the characters prior to their entry on the keypad. In addition, any of a variety of alternative character entry methods could be used, including methods that use only voice or only the telephone keypad. For example, a method could be used in which the user depresses each telephone key a number of times equal to the position of the desired letter, as is common for programming cellular phones. Upon receiving the user's character string from the AVR system, the query server 60 checks the grammar cache 70 (if caching is used) to determine whether a grammar corresponding to the user's search context and character string exists (82).

If no such grammar exists, or if no caching is used, the query server 60 performs an initial search of the appropriate domain (e.g., music) of the product database 62 for all author names starting with the N characters (84). The query server then invokes the dynamic grammar generator 64 to build a grammar from these author names. As mentioned above, in embodiments in which the search engine permits the user to utter other types of terms (such as title terms) along with the author terms, the grammar generator may also incorporate these types of terms into the grammar. For example, the grammar could be derived from the author names and titles of the works located by the initial search. Once generated, the grammar may be stored in the cache 70 together with such information as the character string and search context to which it corresponds and the date and time of creation.

Once the grammar has been generated (86) or read from the cache (88), the grammar is incorporated into a voiceXML page which is provided to the AVR system (90). This page prompts the user by voice to utter the full query. The AVR system 50 interprets this voice query using the supplied grammar, and returns to the web/query server an HTTP request containing the full query in textual form. The query server 60 then executes the search (optionally limiting search's scope to the items located during the initial search), and generates and returns a voiceXML page containing the search results (92).

Figure 4:
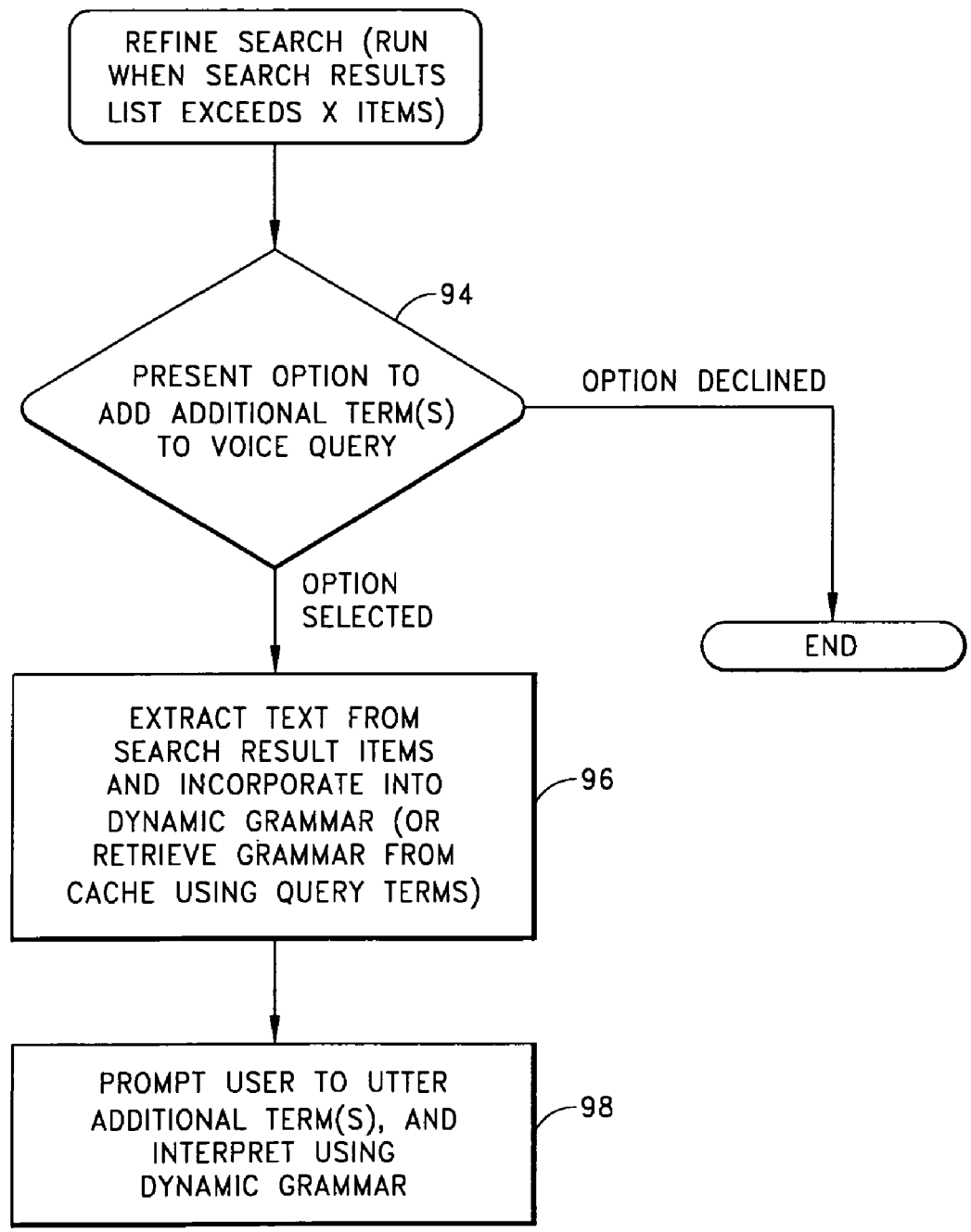
FIG. 4 shows a process for improving voice recognition reliability when a user refines a search by voice.

FIG. 4 illustrates another process for improving voice recognition accuracy of query terms. The process involves generating a dynamic grammar for conducting a refined search after an initial search has been performed. The process may be used independently or in combination with the processes described above. As depicted in FIG. 4, when a user submits a voice query that generates more than a threshold number a hits (e.g., over 20), the user is given the option to refine (narrow) the search by adding one or more terms to the query (94). For example, the user may hear the following voice response: "Your search for <query> returned <hits> items; would you like to add additional terms to your query?"

To increase voice recognition reliability as these additional terms are uttered, the query server 60 generates a dynamic grammar from the initial set of search results (96). The grammar generation methods described above may be used for this purpose. This dynamic grammar is then provided to the AVR system 50 (e.g., within a voiceXML page) and is used to process the voice entry (98). Grammars for the most frequently submitted search queries may be cached in the same manner as described above, except that the grammars would be stored and retrieved using the original set of query terms.

Although this invention has been described in terms of certain preferred embodiments, other embodiments that are apparent to those of ordinary skill in the art are also within the scope of this invention. Accordingly, the scope of the present invention is defined only by reference to the appended claims.

What is claimed is:

1. A method for improving voice recognition accuracy when a user submits a search query by voice to search a domain of items, the method comprising:

prompting a user to submit a set of characters of a voice query for searching the domain of items, and receiving the set of characters from the user, wherein the voice query is an utterance by the user of a search query, and the set of characters defines a portion of the search query;

in response to receiving the set of characters from the user, identifying a subset of items in the domain that correspond to the set of characters;

generating a dynamic grammar based at least in part on the subset of items, said grammar specifying valid utterances for interpreting the voice query;

prompting the user to submit the voice query, and receiving the voice query from the user; and interpreting the voice query using the dynamic grammar.

2. The method as in claim 1, wherein prompting a user to submit a set of characters comprises prompting the user to submit the first N characters of a query term, where N is greater than 1.

3. The method as defined in claim 1, wherein prompting a user to submit a set of characters comprises prompting the user to submit a set of characters of an author's name.

4. The method as defined in claim 3, wherein generating a dynamic grammar comprises incorporating into the grammar names of authors of the items within the subset of items.

5. The method as defined in claim 4, wherein the dynamic grammar consists essentially of the names of the authors of the items within the subset of items.

6. The method as defined in claim 4, further comprising incorporating into the dynamic grammar non-author terms extracted from the subset of items.

7. The method as defined in claim 1, wherein prompting a user to submit a set of characters comprises prompting the user to select the characters on a telephone keypad.

8. The method as defined in claim 7, wherein prompting a user to submit a set of characters further comprises prompting the user to utter the characters, and wherein receiving the set of characters comprises using the keypad entries of the characters to interpret utterances by the user of the characters.

9. The method as defined in claim 1, wherein generating a dynamic grammar comprises extracting text from the subset of items.

10. The method as defined in claim 9, wherein extracting text from the subset of items comprises extracting the text from a database field corresponding to a search context of the query.

11. The method as defined in claim 1, further comprising storing the dynamic grammar within a cache for subsequent use.

12. The method as defined in claim 1, wherein prompting a user to submit a set of characters comprises prompting the user to enter a fixed number of characters, wherein the fixed number is selected based on a target grammar size.

13. The method as defined in claim 1, wherein receiving the set of characters comprises determining in real time whether a number of entered characters is sufficient to produce a grammar that falls below a threshold size.

14. The method as defined in claim 1, further comprising:
executing a search using the voice query as interpreted using the dynamic grammar to identify a set of search result items;
providing the user an option to add an additional query term to the voice query to refine the search;
generating a second dynamic grammar at least in part from the set of search result items; and receiving a voice entry of the additional query term from the user, and interpreting the voice entry using the second dynamic grammar.

15. A method for improving voice recognition accuracy when a user submits a query by voice to search a domain of items, the method comprising:
receiving a set of characters entered by a user, the set of characters representing a portion of a query; in response to receiving the set of characters, selecting a grammar which is derived at least in-part from text extracted from a subset of items that correspond to the set of characters entered by the user; and
providing the grammar to a voice recognition system for use in interpreting the query as entered by the user by voice;
whereby the user's entry of a subset of characters of the query, together with the user's utterance of the full query, are used in combination to capture the query.

16. The method as defined in claim 15, wherein selecting a grammar comprises:
executing an initial search to identify the subset of items that correspond to the set of characters; and
extracting text from the subset of items for incorporation into the grammar.

17. The method as defined in claim 16, wherein extracting text from the subset of items comprises extracting the text from a database field corresponding to a search context of the query.

18. The method as defined in claim 17, wherein the search context comprises an author search, and the database field is an author field.

19. The method as defined in claim 15, wherein selecting a grammar comprises reading a previously generated grammar from memory based on the set of characters entered by the user.

20. The method as in claim 15, wherein receiving a set of characters comprises receiving the first N characters of a query term, where N is greater than 1.

21. The method as in claim 15, wherein receiving a set of characters comprises receiving characters entered at least in-part using a telephone keypad.

22. The method as in claim 15, wherein receiving a set of characters comprises using a telephone keypad entry of a character by the user to interpret an utterance of the character by the user.

23. The method as defined in claim 15, wherein receiving a set of characters comprises determining in real time whether a number of entered characters is sufficient to produce a grammar that falls below a threshold size.

24. A system for conducting searches by voice, comprising:
a database of items;
a query server which searches the database of items according to voice queries from users, the query server coupled to a voice recognition system which interprets the voice queries according to grammars;
a first code module which causes a user to be prompted to enter a set of characters of a query such that the user may partially specify the query; and
a second code module which causes the user to be prompted to utter the query;
wherein the query server is programmed to use the set of characters to select a grammar for use by the voice recognition system to interpret the query as uttered by the user.

25. The system as defined in claim 24, wherein the first and second code modules comprise voiceXML coding.

26. The system as defined in claim 24, wherein the query server selects the grammar by at least:
  executing a preliminary search to identify a subset of items that match the set of characters; and
  extracting text from the subset of items to incorporate into grammar.

27. The system as defined in claim 26, wherein the query server is programmed to extract author names from the subset of items to generate a grammar for performing a voice-based author search.

28. The system as defined in claim 24, wherein the query server is programmed to select the grammar from memory using the set of characters.

29. The system as defined in claim 24, wherein the set of characters is a set of the first N letters of a query term, where N is greater than 1.

30. The system as defined in claim 29, wherein the query term is a name of an author.

31. The system as defined in claim 29, wherein N is selected based on a target grammar size.

32. The system as defined in claim 24, wherein the first code module prompts the user to both utter, and enter on a telephone keypad, each alphabetic character of the set.

33. A method of assisting users in locating items in a database using voice queries, the method comprising:
  receiving a voice query from a user, and identifying a set of search result items that are responsive to the voice query;
  providing the user an option to refine the query by adding an additional query term;
  generating a grammar at least in-part by extracting text from the set of search result items; and
  using the grammar to interpret an utterance by the user of an additional query term.

34. The method as defined in claim 33, wherein generating a grammar comprises extracting text from a database field corresponding to a search context of the query.

35. The method as defined in claim 33, wherein using the grammar to interpret an utterance comprises using the grammar to interpret utterances of multiple additional query terms by the user.

36. The method as defined in claim 33, wherein the grammar is generated in response to selection by the user of the option to add an additional query term.

37. The method as defined in claim 33, wherein the option to refine the query is presented to the user only if the number of items in the set exceeds a predefined threshold.

38. The method as defined in claim 33, further comprising storing the grammar in a cache for use with subsequent query submissions.

39. The method as in claim 1, wherein the set of characters is a subset of the characters contained in a textual representation of the voice query.

40. A system that operates according to the method of claim 1.

41. A system that operates according to the method of claim 15.

42. A system that operates according to the method of claim 33.

43. A method of capturing a search query specified by a user by telephone, the method comprising:
  receiving from the user an indication of a subset of the characters contained in the search query, said indication of the subset of characters being specified at least in part as telephone keypad entries;
  receiving from the user a voice utterance that represents the entire search query; and
  interpreting the voice utterance using a voice recognition grammar that corresponds to the indication of the subset of characters, said voice recognition grammar specifying valid utterances.

44. The method of claim 43, wherein the indication of the subset of characters further comprises respective voice utterances of the characters in the subset.

45. The method of claim 43, further comprising selecting the voice recognition grammar from a repository of previously-generated voice recognition grammars in which different voice recognition grammars correspond to different sets of characters.

46. The method of claim 43, further comprising generating the voice recognition grammar on-the-fly in response to input from the user.

47. The method of claim 43, further comprising executing a database search using a textual representation of the voice utterance.

48. A system that operates according to the method of claim 43.

* * * * *